United States Patent
Makansi et al.

(10) Patent No.: US 6,771,597 B2
(45) Date of Patent: *Aug. 3, 2004

(54) METHOD AND APPARATUS FOR TRANSMITTING MESSAGES

(75) Inventors: Tarek Makansi, Tucson, AZ (US); James Michael Gampper, Tucson, AZ (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,228

(22) Filed: Jul. 31, 1998

(65) Prior Publication Data

US 2002/0154631 A1 Oct. 24, 2002

(51) Int. Cl.[7] .............................................. G01R 31/08
(52) U.S. Cl. ........................... 370/230; 370/392; 713/1; 713/189
(58) Field of Search ................................. 370/230, 231, 370/235, 352, 351, 394, 470, 401, 473, 528, 392; 708/250; 713/1, 189, 201, 153, 166; 714/779; 380/9

(56) References Cited

U.S. PATENT DOCUMENTS

| | | | |
|---|---|---|---|
| 4,500,989 A | * 2/1985 | Dahod | ........................ 370/85 |
| 5,109,384 A | * 4/1992 | Tseung | ........................ 371/32 |
| 5,309,435 A | * 5/1994 | Hirome | .................... 370/85.12 |
| 5,416,842 A | 5/1995 | Aziz | |
| 5,420,866 A | * 5/1995 | Wasilewski | ............. 370/110.1 |
| 5,490,252 A | 2/1996 | Macera et al. | |
| 5,548,646 A | 8/1996 | Aziz et al. | |
| 5,548,649 A | 8/1996 | Jacobson | |
| 5,550,984 A | 8/1996 | Gelb | |
| 5,588,060 A | 12/1996 | Aziz | |
| 5,604,803 A | 2/1997 | Aziz | |
| 5,633,933 A | 5/1997 | Aziz | |
| 5,638,448 A | 6/1997 | Nguyen | |
| 5,668,877 A | 9/1997 | Aziz | |
| 5,668,878 A | 9/1997 | Brands | |
| 5,671,285 A | 9/1997 | Newman | |
| 5,673,316 A | 9/1997 | Auerbach et al. | |
| 5,673,322 A | 9/1997 | Pepe et al. | |
| 6,122,743 A | * 9/2000 | Shaffer et al. | ............. 713/201 |
| 6,209,104 B1 | * 3/2001 | Jalili | ........................ 713/202 |

FOREIGN PATENT DOCUMENTS

| | | |
|---|---|---|
| JP | 08-97860 | 4/1996 |
| JP | 09153014 | 6/1997 |
| WO | WO 97/16902 | 5/1997 |
| WO | WO 97/28505 | 8/1997 |

OTHER PUBLICATIONS

IBM Technical Disclosure Bulletin, "Passport File for Secure Access to the Internet", vol. 39, No. 2, pp. 333–334 (Feb. 1996).
IBM Technical Disclosure Bulletin, "Internet Image Statements", vol. 39, No. 10, pp. 43–45 (Oct. 1996).
Eisenberg, A., "Confidentially Yours", *Scientific American*, 1 page (Jun. 1998).
Rivest, R. L., "Chaffing and Winnowing: Confidentiality without Encryption", http://theory.lcs.mit.edu/~rivest/chaffing.txt., 8 pgs..

* cited by examiner

*Primary Examiner*—Duc Ho
(74) *Attorney, Agent, or Firm*—Crawford Maunu PLLC

(57) ABSTRACT

A method of transmitting a message as packets over a network includes at least one from the group consisting of: forming packets with random sizes, transmitting the packets in random order, transmitting the packets through different routes in the network, and transmitting dummy data within the packets. An article of manufacture may include a computer-readable medium having instructions for causing a computer to perform at least one from the group described.

13 Claims, 4 Drawing Sheets

METHOD AND APPARATUS FOR TRANSMITTING MESSAGES

BACKGROUND OF THE INVENTION

1. Field of the Invention

This invention relates in general to transmission of messages, and more particularly to a method and apparatus for transmitting messages as packets over a network.

2. Description of Related Art

During the last decade, the amount of information that is transmitted in various networks has multiplied a great number of times. With the increased reliance on electronically transmitted messages comes a greater vulnerability to intrusion or interception by adversaries or other unauthorized persons. Today information is communicated over a multitude of different networks, many of which are connected to each other. The most well known and most frequently used network is, of course, the Internet.

There are many different kinds of message transmissions which the sending and receiving parties have an interest in securing from unauthorized access. Companies have a need to transmit secret information over their internal networks, and sometimes there is a need to provide enhanced security of the individual message although the network itself is not readily available to unauthorized persons. The globally increasing use of the Internet has partly been of a commercial nature which, of course, creates a variety of new security concerns. Individual consumers which shop over the Internet have a legitimate interest in being able to transmit, for example, a credit card number in reliance on satisfactory security measures being taken in the transmission. As is well known, unauthorized knowledge of a credit card number can easily be used for unauthorized purchases. Other kinds of transmitted information is also sensible and must be protected appropriately. Customer information or other confidential information to which an unauthorized person gains access can result in severe detrimental effects for the parties involved. Aside from economic damages resulting from unauthorized access to information transmitted in messages over a network, the sender and recipient, of course, have a legitimate interest in that the contents of their messages remain confidential if they so prefer, regardless of whether the communication pertains to commercial enterprises or private matters.

A frequently used method for increasing security of transmitted messages is encryption. Many different kinds of encryption exist, and the main idea of the method is to alter an original message in a way that only the sender and recipient can reverse to gain access to the original message. Federal export regulations control the export of encryption methods and devices which are capable of encrypting above a certain strength level. In order to export strong encryption software and devices, export licenses have to be obtained.

However, relying solely on encryption as a means for protecting information during message transmission may not always be sufficient. An adversary who intends to intercept or otherwise interfere with the transmission of secure messages will typically be familiar with even the most sophisticated encryption methods that are publicly known. If an unauthorized person gains access to an encrypted message, there is always a risk that the person will attempt to identify the encryption key, for example, by using a computer to try a great number of different encryption keys on the encrypted message. Typically, the larger the encrypted message, the greater is the chance that an adversary may identify the encryption key. Another aspect is that the encryption in itself tends to draw unwanted attention from adversaries who may be interested in gaining access to secret information.

It can be seen that there is a need for methods and apparatus which allow messages to be transmitted in ways such that potential adversaries are given access to a relatively small amount of information. There is a need for methods and apparatus for transmitting a message as packets over a network, where one or more security steps may be taken to make the message less susceptible to unauthorized access.

SUMMARY OF THE INVENTION

To overcome the limitations in the prior art described above, and to overcome other limitations that will become apparent upon reading and understanding the present specification, the present invention discloses methods and apparatus for transmitting a message as packets over a network.

The present invention solves the above-described problems by providing a method of transmitting a message as packets including at least one from the group consisting of: forming packets with random sizes, transmitting the packets in random order, transmitting the packets through different routes in the network, and transmitting dummy data within the packets.

An article of manufacture in accordance with the principles of the invention includes a computer-readable medium having instructions for causing a computer to perform the method of invention.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method of transmitting a message as packets over a network. The method may be performed, for example, by a computer which is capable of transmitting messages over the network. The computer may, for example, perform the method by reading instructions from a computer readable medium. Many different kinds of computers, including varying hardware environments, can be used to perform the method of the invention, for example, the hardware environment described below.

Figure 1:
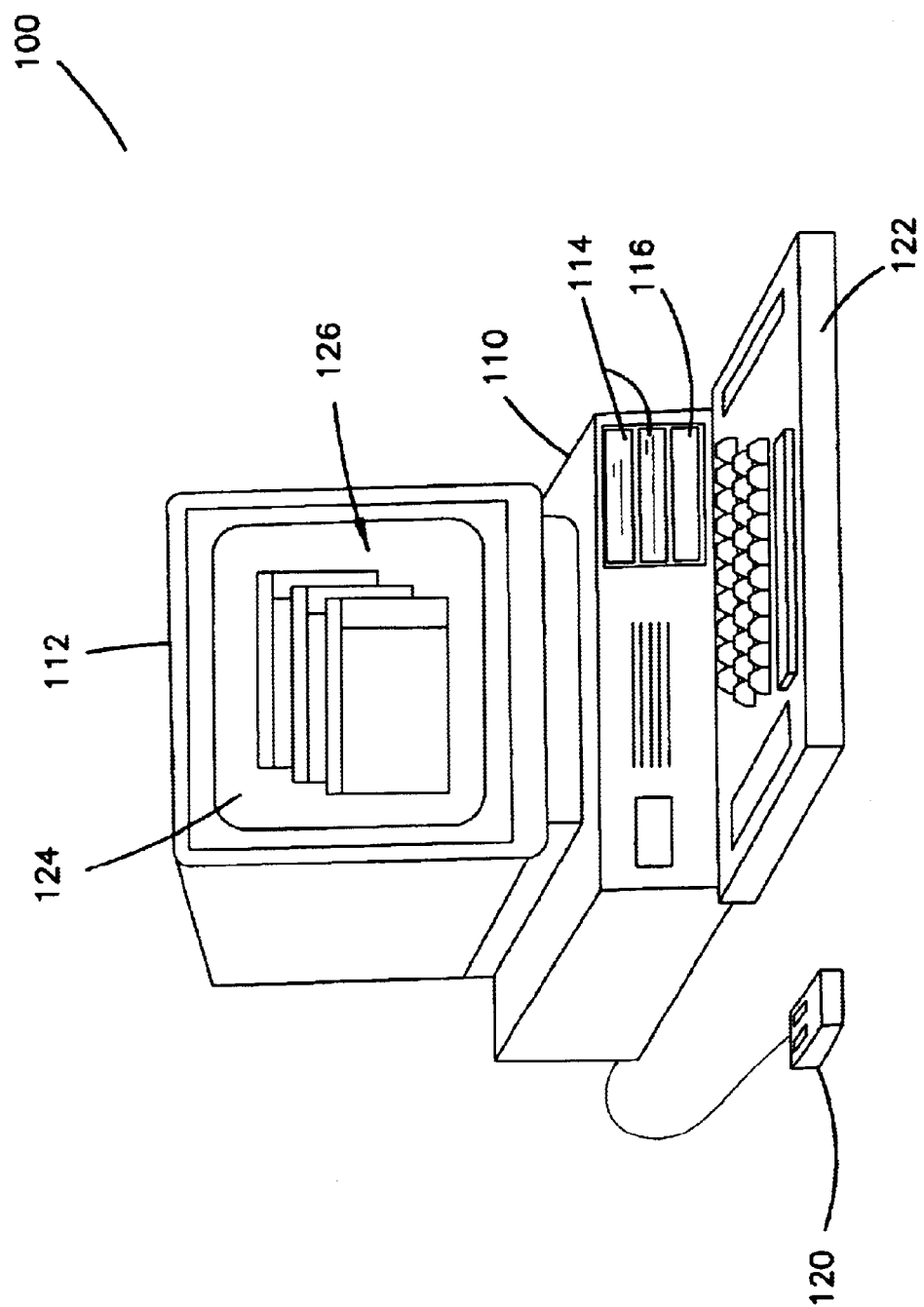
FIG. 1 is a block diagram illustrating an exemplary hardware environment of the present invention.

FIG. 1 is a block diagram that illustrates an exemplary hardware environment for the method according to the present invention. The present invention is typically implemented using a computer 110 comprised of a microprocessor, random access memory (RAM), read-only memory (ROM), and other standard components. It is envisioned that attached to the computer 110 may be a monitor 112, floppy disk drives 114, CD-ROM drives 116. Also included in the preferred embodiment may be input devices, for example, a mouse pointing device 120 and a keyboard 122. As is well-known, the computer 110 may be provided with a modem or other communication device (not shown) for sending and receiving data from outside the computer 110. For example, the computer 110 may be provided with an internal modem capable of providing access between the computer 110 and at least one network, such as the Internet.

The computer 110 operates under the control of an operating system 124, such as the Windows, OS/2, Macintosh, or UNIX operating systems, which is represented in FIG. 1 by the screen display on the monitor 112. The computer 110 executes one or more computer programs 126, which are represented in FIG. 1 by the "windows" displayed on the monitor 112, under the control of the operating system 124. The present invention comprises transmission of messages over a network, and a function for performing the method may, for example, be implemented in the operating system 124 and/or computer programs 126.

Generally, the operating system 124 and the computer programs 126 may be tangibly embodied in a computer-readable medium or carrier, e.g. one or more of the fixed and/or removable data storage devices 114 and 116, or other data storage or data communications devices. Both the operating system 124 and the computer programs 126 may be loaded from the data storage devices 114 and 116 into the random access memory of the computer 110 for execution by the microprocessor as discussed above with reference to FIG. 1. Both the operating system 124 and the computer programs 126 comprise instructions which, when read and executed by the microprocessor of the computer 110, causes the computer 110 to perform the steps necessary to execute the steps or elements of the present invention.

Although an exemplary computer system configuration is illustrated in FIG. 1, those skilled in the art will recognize that any number of different configurations performing similar functions may be used in accordance with the present invention.

The messages referred to in this description may be of many different kinds. Any type of information that can be transmitted over a network as packets may be referred to as a message. For example, information such as written materials, voice recordings, music recordings, photographs, drawings, videograms, etc. are messages which may be transmitted as packets over a network. Typically, the information will be converted to digital form in order to facilitate the transmission. Many different well-known methods of converting information into digital form may be used with embodiments of the invention.

In this description, messages are consequently referred to as being divided into "packets". It is noted that other terms may be used for the concept of dividing an information structure into units prior to transmission. For example, the term "cells" is sometimes used. The invention is intended to cover both these notions, and other notions as well.

The messages transmitted in using embodiments of the invention may or may not be encrypted. As noted above, encryption includes altering the original message in a way that only the sender and the recipient can easily reverse. Many different well-known methods of encryption may be used with the embodiments of the invention. Some fundamentals of encryption and an exemplary use will be given below.

Generally speaking, encryption involves mapping a message into an encrypted message. Similarly, decrypting involves mapping the encrypted message back into the message. The message may be defined as an entity in a message space, and the encrypted message may similarly be defined as an entity in a crypto space. Any method of encrypting can then be defined as a function which maps entities from the message space into entities in the crypto space. Various encryption methods may perform the encryption in many different ways.

Even if two encryption methods perform the mapping between the message space and the crypto space in similar ways, each method may utilize a unique key which individualizes the encryption function and prevents unauthorized decryption of the encrypted message unless the specific key is known. Encryption keys are typically characterized by the number of bits of information they include. Generally, the greater number of bits the encryption key includes, the more difficult it is for an unauthorized person to determine the exact encryption key that was used in encrypting the message.

In order for the receiver of the encrypted message to carry out the decryption, the receiver must have access to the encryption key which was used in encrypting the message. Various well-known methods of transmitting encryption keys between sender and recipient may be used with embodiments of the invention. When using methods in accordance with the principles of the invention, a user may choose to encrypt the message.

Methods of the invention include transmitting the message as packets over a network. Many different well-known message formats may be used. Typically, the particular network will permit messages of one or more formats to be transmitted. For example, messages may be transmitted over the Internet using the Internet Protocol (IP).

Figure 2:
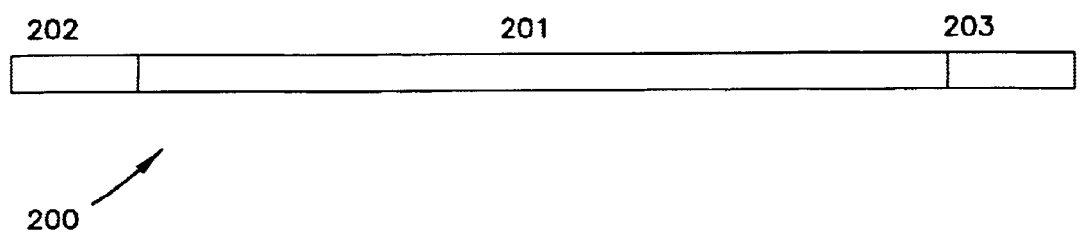
FIG. 2 is a diagram schematically illustrating a standard message format.

An exemplary message format is schematically shown in FIG. 2. The message format 200 includes data portion 201, header portion 202 and trailer portion 203. It is noted that the proportions between the different portions of the message format 200 will vary between messages. For example, when large amounts of information are transmitted in the message, the header and trailer portions 202 and 203 will be relatively small compared to the information portion 201. The header and trailer portions 202 and 203 are sometimes collectively referred to as the "frame".

The header portion 202 may include information that pertains to the message that is being transmitted and/or to the transmission of the message. For example, the header portion 202 may include a preamble, destination and source addresses, various delimiters, message length, etc.

The trailer portion 203 may include various information pertaining to the message being transmitted and/or the transmission of the message. For example, the trailer portion 203 may include facilities for verifying the authenticity of the message and/or confirming the integrity of the information. As an example, the sender of the message may calculate a check sum for the contents of the message and store the check sum in the trailer portion 203, whereby a receiver of the message can recalculate the check sum to verify the integrity of the information in the message.

It is noted that during transmission of the message, matter may be added to, or removed from, the header portion 202 and/or the trailer portion 203. It is noted that the message format 200 is a conventional message format, and that the invention is intended to cover the use of both this format and other formats which may exist or which may be developed.

Figure 3:
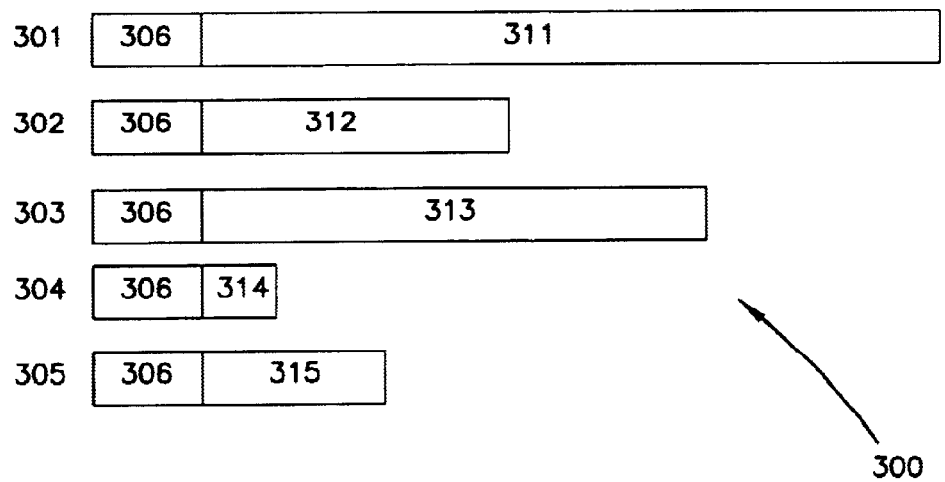
FIG. 3 schematically illustrates a message divided into packets with random length.

An embodiment in accordance with the principles of the invention will now be described with reference to FIG. 3. In this exemplary embodiment, the message 300 has been divided into packets 301–305. In dividing the message 300, the packets 301–305 were formed with random sizes. Prior to dividing the message 300 into the packets 301–305, the message 300 may have been encrypted using well known encryption methods. It is noted that the encryption may be carried out at a different stage in the transmission, for example, after the message 300 has been divided into the packets 301–305. It should be noted the message 300 could be divided into more or fewer packets than the five packets shown in FIG. 3.

When the packets 301–305 are formed with random sizes, they may be formed from partly overlapping portions of the original message 300, such that the entire message 300 is distributed between the data portions 311–315. For example, the data portion 311 of packet 301 may be formed from a portion at the beginning of the original message 300. In this example, the data portion 312 of packet 302 may then be formed starting with a bit somewhere inside the portion that forms the packet 301, such that the data portions 311 and 312 partly overlap.

In dividing the message 300 into packets 301–305 with random sizes, and distributing the packets 301–305 over a network to a receiver, it may be more difficult for unauthorized persons to gain access to the message 300. The randomized packet sizes are preferably kept short, to avoid giving an unauthorized person access to much information by intercepting a packet. It is noted that the division of the message into packets occurs at the bit level, and that byte boundaries are not preserved.

Figure 4:
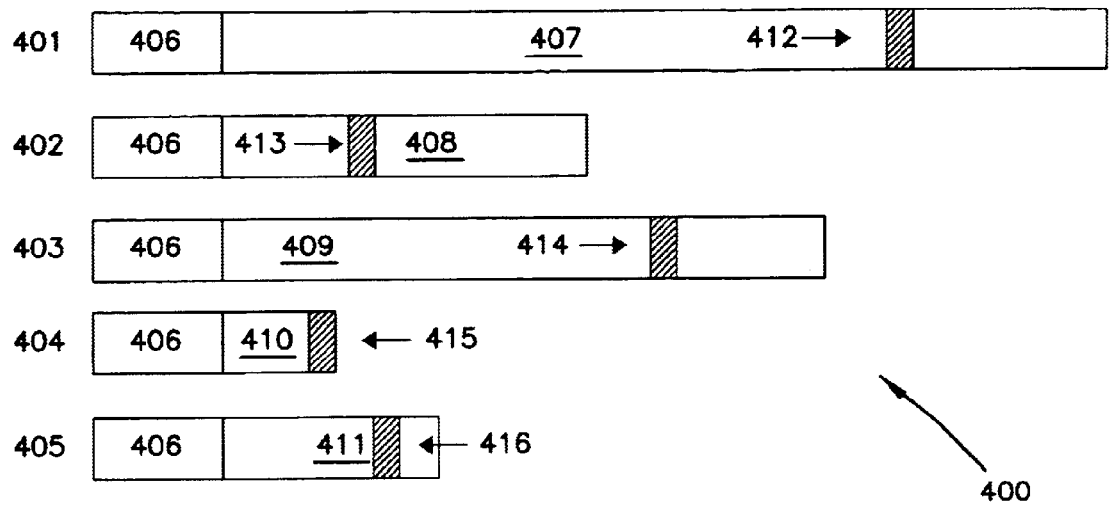
FIG. 4 schematically illustrates a message divided into packets each containing a hidden ordering key.

Another embodiment in accordance with the principles of the invention will now be described with reference to FIG. 4. In this exemplary embodiment, the message 400 has been divided into packets 401–405. The message 400 was divided such that the packets 401–405 were formed with random sizes. The packets 401–405 include data portions 407–411. It is noted that the message 400 may optionally be divided such that the sizes of the packets 401–405 are not randomized. The message 400 may be divided into more or fewer packets than the five packets shown in FIG. 4. Encryption may be used, for example such that the packets 401–405 are encrypted, or such that the message 400 is encrypted prior to dividing it into the packets 401–405. A header section 406 is schematically shown at the beginning of each packet 401–405.

In this example, the packets 401–405 will be transmitted in random order through the same route in the network. For example, if the packets 401–405 were formed such that the data portions 407–411 include consecutive portions of the message 400, the order of the packets 401–405 will be randomized in transmission. As another example, if the packets 401–405 were formed such that the data portions 407–411 include portions of the message 400 in random order, the packets 401–405 may be transmitted in any order.

The recipient which receives the packets 401–405 in random order, must be able to sort them in the correct sequence in order to be able to read the message 400. The recipient may determine the correct order of the packets 401–405 in different ways. For example, ordering keys 412–416 may be inserted in the packets 401–405. The receiver may use the ordering keys 412–416 to determine in which order to sequence the packets 401–405. The ordering keys may be "hidden" in each data portion 407–411, whereby it may be more difficult for an unauthorized person to use the ordering keys 412–416 to sequence the packets 401–405 in correct order. Including hidden ordering keys 412–416 may, for example, include hiding the ordering key in the data portion of the packet using well-known methods such as steganography. As another example, the ordering keys 412–416 may be encrypted using well-known encryption methods.

Another embodiment in accordance with the principles of the invention will now be described with reference to FIG. 5. An exemplary network 500 is schematically illustrated as consisting of the network constituents 501–509. The network constituents 501–509 are connected to each other to enable, for example, messages to be transmitted between the network constituents 501–509.

Figure 5:
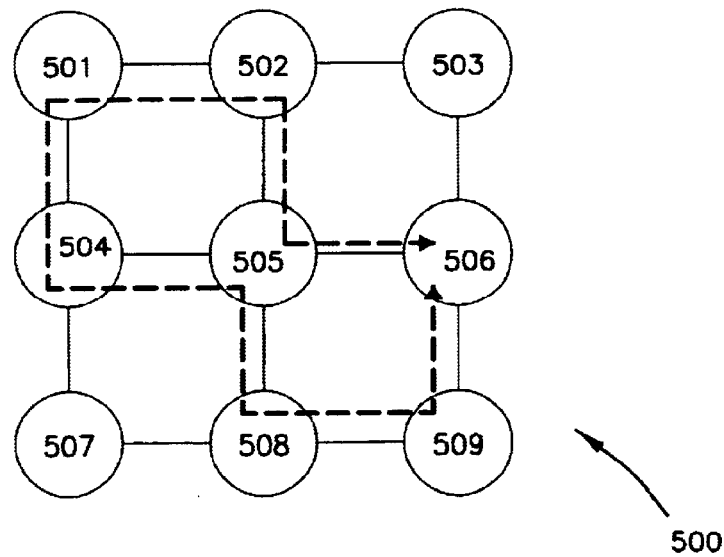
FIG. 5 schematically illustrates the transmission of two packets through different routes in a network.

It is noted that connection lines are shown between adjacent network constituents; however, connections between remote network constituents, such as between the network constituents 503 and 507, or between the constituents 502 and 506, may also exist but have been omitted from FIG. 5 for clarity. It is also noted that the connections between the network constituents 501–509 may be of different kinds. For example, wireless connections may be used.

Each one of the network constituents 501–509 may be a device or a network which is capable of exchanging messages with the other network constituents in the network 500. For example, one or more of the network constituents 501–509 may be a computer or a network or the Internet. When one or more of the network constituents 501–509 is a network, a user may access that network using any well-known device, such as a computer. It is noted that the network 500 may include more or fewer network constituents than the nine shown in FIG. 5.

An exemplary transmission of messages will now be described. A sender has access to the network 500 at the network constituent 504. The access allows the sender to send messages over the network 500 for receipt by any of the network constituents. In transmitting a message over the network 500, the sender may specify a particular route through which the message will be sent. For example, the sender may choose to transmit a packet of the message via the network constituents 501, 502 and 505, for receipt by the network constituent 506, as schematically illustrated by the dashed arrow 510. As another example, the sender may transmit a packet of a message from the network constituent 504 via the network constituents 505, 508 and 509, for receipt by the network constituent 506, as schematically illustrated by the dashed arrow 511. It is noted that many different routes through the network 500 may be chosen. It is possible that the message will be transmitted via the same network constituent more than once when following a route over the network 500. It is noted that the schematic illustration in FIG. 5 not necessarily represents a physical or geographical location of the network constituents 501–509.

A sender may choose to transmit a message as packets through different routes in the network 500 in order to make unauthorized access to the message more complicated. Furthermore, this may make it more difficult for an unauthorized person to gain access to all the transmitted packets. As another example, the packets may be transmitted through random routes in the network 500.

In using the embodiment of the invention, the message may be divided into packets in different ways, for example as described elsewhere herein. It is noted that the message and/or the packets may be encrypted prior to transmission over the network 500.

Figure 6:
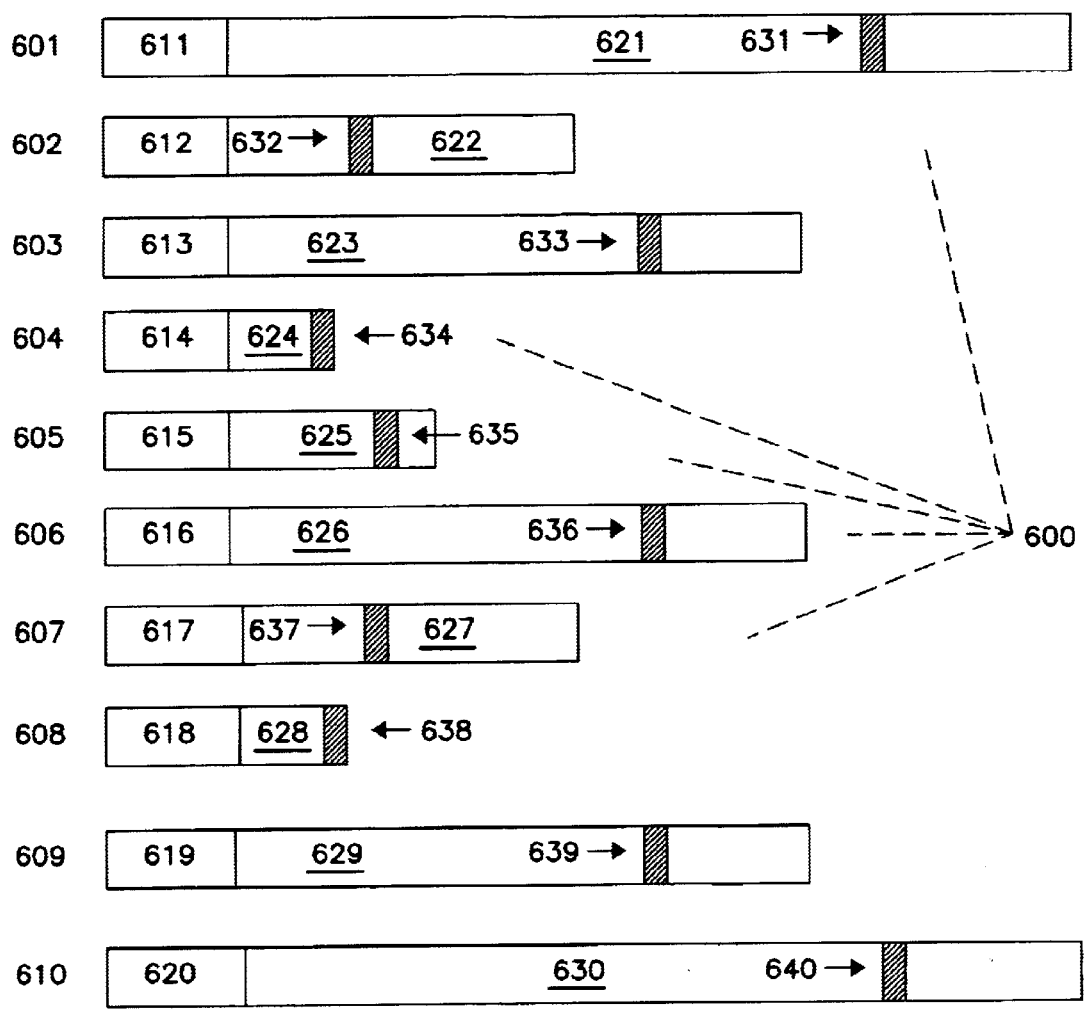
FIG. 6 schematically illustrates a message with dummy data placed in the message, the message being divided into packets.

Yet another embodiment in accordance with the principles of the invention will now be described with reference to FIG. 6. In this exemplary embodiment, a message 600 has been divided into packets, schematically shown as the packets 601, 604, 605, 606 and 608. Furthermore, dummy data are placed inside the message 600. The dummy data includes dummy bits that are not part of the original message. The packets 601, 604, 605, 606 and 608 include the message 600 and dummy data, such that one or more of the packets contain parts of the original message 600 and dummy data.

Interspersed with the above-mentioned packets are dummy packets 602, 603, 607, 609 and 610. The packets 601–610 have header portions 611–620, for example indicating routes in a network through which the packets will be transmitted. The dummy packets include non-data contents, i.e. contents that are not part of the original message 600.

The dummy packets will be transmitted with the packets of the message 600 in order to make it more difficult for an unauthorized person to determine the contents of the message 600. The contents of the message 600 is distributed through the data portions 621, 624, 625, 626 and 628 together with the dummy data as described above.

As noted above, the packets 601–610 may be formed with random sizes. It is also noted that the message 600 and/or the packets 601–610 may be encrypted prior to transmission.

The packets 601–610 may be provided with ordering keys 631–640. The ordering keys 631–640 may be placed randomly in the packets 601–610. The ordering keys may be hidden and/or encrypted. Furthermore, the ordering keys 631–640 may be used by the recipient to distinguish the dummy packets from the packets of the message 600. For example, the ordering keys of the dummy packets may include ordering numbers such that the dummy packets will be placed at the end when the packets 601–610 are placed in correct sequence. Other ways by which the sender can distinguish the dummy packets from the packets containing the message 600 may be used.

For clarity, the ordering keys of the dummy packets 602, 603, 607, 609 and 610 have been shown with a lighter shading. It is noted that the dummy packets preferably should be indistinguishable from the packets of the message 600 to an unauthorized person, in order to make unauthorized access to the message 600 more difficult.

It is noted that the packets 601–610 may be transmitted over the network using one or more of the exemplary methods described above. For example, the packets 601–610 may be transmitted in random order and/or through different routes in the network. The amount of dummy data placed in the original message 600 may vary. The amount of dummy packets transmitted together with the packets containing the message 600 may vary from a single dummy packet up to and including large numbers of dummy packets exceeding the number of packets containing the message 600.

In the above, various embodiments of methods have been described. It will be apparent to one skilled in the art that the methods may be used individually as well as in combinations with each other.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of transmitting a message as packets over a network, the method comprising:

providing a predetermined plurality of security processes for selection in processing packets to be transmitted, wherein the predetermined plurality of security processes includes:

forming packets with random sizes;

transmitting the packets in random order, wherein the random includes inserting a hidden ordering key in each packet;

transmitting the packets through different routes in a network; and transmitting dummy data within the packets;

selecting at least one process from the predetermined plurality of security processes for preventing data detection; and processing packets according to the selected at least one process from the predetermined plurality of security processes.

2. The method of claim 1, wherein the hidden ordering key is inserted at a random position in the packet.

3. The method of claim 2, further including encrypting the hidden ordering key.

4. The method of claim 1, wherein transmitting the packets through different routes includes inserting a hidden ordering key in each packet.

5. The method of claim 1, wherein transmitting the packets through different routes includes transmitting at least one packet through each route.

6. The method of claim 1, wherein transmitting the packets through different routes includes transmitting the packets through random routes.

7. The method of claim 1, further including transmitting dummy packets having non-data contents with the packets.

8. The method of claim 1, further including encrypting the message.

9. The method of claim 1, wherein the selecting at least one process from the predetermined plurality of security processes is selecting two or more processes from the predetermined plurality of security processes.

10. An article of manufacture comprising a computer-readable readable medium having instructions for causing a computer to perform a method for transmitting a method as packets over a network, the message comprising:

providing a predetermined plurality of security processes for selection in processing packets to be transmitted, wherein the predetermined plurality of security processes includes:

forming packets with random sizes;

transmitting the packets in random order, wherein the random order includes inserting a hidden ordering key in each packet;

transmitting the packets through different routes in a network; and transmitting dummy data within the packets;

selecting at least one process from the predetermined plurality of security processes for preventing data detection; and processing packets according to the selected at least one process from the predetermined plurality of security processes.

11. The article of manufacture of claim 10, wherein the selecting at least one process from the predetermined plurality of security processes is selecting two or more processes from the predetermined plurality of security processes.

12. A method of transmitting a message as packets over a network, the method comprising:

providing a predetermined plurality of security processes for selection in processing packets to be transmitted, wherein the predetermined plurality of security processes includes:

forming packets with random sizes;

transmitting the packets in random order through different routes in a network, wherein the random order includes inserting a hidden ordering key in each packet and transmitting dummy data within the packets;

selecting at least one process from the predetermined plurality of security processes for preventing data detection; and processing packets according to the selected at least one process from the predetermined plurality of security processes.

13. The method of claim 12, wherein the selecting at least one process from the predetermined plurality of security processes is selecting two or more processes from the predetermined plurality of security processes.

* * * * *

UNITED STATES PATENT AND TRADEMARK OFFICE
CERTIFICATE OF CORRECTION

PATENT NO. : 6,771,597 B2
DATED : August 3, 2004
INVENTOR(S) : Makansi et al.

It is certified that error appears in the above-identified patent and that said Letters Patent is hereby corrected as shown below:

Column 8,
Line 27, "random includes" should read -- random order includes --.
Line 40, "The method of claim 2," should read -- The method of claim 1, --.
Line 61, "transmitting a method as" should read -- transmitting a message as --.
Line 62, "the message comprising:" should read -- the method comprising: --.

Column 10,
Line 8, "packet and" should read -- packet; and --.
Line 9, the entire line should align with the left margin.

Signed and Sealed this

Fifteenth Day of February, 2005

JON W. DUDAS
*Director of the United States Patent and Trademark Office*